US008793158B2

(12) United States Patent
Wee et al.

(10) Patent No.: US 8,793,158 B2
(45) Date of Patent: Jul. 29, 2014

(54) METHOD AND SYSTEM OF INSPECTING ADVERTISEMENT THROUGH KEYWORD COMPARISON

(75) Inventors: Wu Sic Wee, Gyeonggi-do (KR); Minuk Kim, Seoul (KR); Hye Jung Roh, Gyeonggi-do (KR)

(73) Assignee: NHN Business Platform Corporation, Seongnam-si (KR)

( * ) Notice: Subject to any disclaimer, the term of this patent is extended or adjusted under 35 U.S.C. 154(b) by 553 days.

(21) Appl. No.: 12/113,182

(22) Filed: Apr. 30, 2008

(65) Prior Publication Data

US 2008/0275783 A1 Nov. 6, 2008

(30) Foreign Application Priority Data

May 4, 2007 (KR) .................. 10-2007-0043654

(51) Int. Cl.
*G06Q 40/00* (2012.01)
*G06Q 30/02* (2012.01)

(52) U.S. Cl.
CPC ............ *G06Q 30/02* (2013.01); *G06Q 30/0256* (2013.01); *G06Q 30/0277* (2013.01)
USPC ...................................... 705/14.2

(58) Field of Classification Search
USPC ......................................... 705/14
See application file for complete search history.

(56) References Cited

U.S. PATENT DOCUMENTS

| 6,895,402 | B1* | 5/2005 | Emens et al. ........................ 1/1 |
| 7,660,737 | B1* | 2/2010 | Lim et al. .................. 705/14.49 |
| 2002/0052925 | A1* | 5/2002 | Kim et al. ..................... 709/217 |
| 2006/0149623 | A1* | 7/2006 | Badros et al. ................... 705/14 |
| 2007/0214132 | A1* | 9/2007 | Grubb et al. ..................... 707/5 |

FOREIGN PATENT DOCUMENTS

| JP | 2006-309376 | 11/2006 |
| KR | 10-2004-0104060 | 12/2004 |
| KR | 10-2006-0005242 | 1/2006 |
| KR | 10-2006-0039597 | 5/2006 |
| KR | 10-2007-0029967 | 3/2007 |

OTHER PUBLICATIONS

Overture sponsored search, Published on Internet magazine 2nd stage, Japan, Jan. 1, 2004, vol. 108, p. 106-113.

* cited by examiner

*Primary Examiner* — Hani M Kazimi
*Assistant Examiner* — Hatem M Ali
(74) *Attorney, Agent, or Firm* — Harness, Dickey & Pierce (57) ABSTRACT

A method and system of inspecting advertising contents of a keyword advertisement is provided. The method includes: crawling a Universal Resource Locator (URL) registered by an advertiser and extracting a URL keyword related to an advertisement site of the advertiser; extracting a target keyword from a plurality of advertisement information being registered in relation to the URL; and determining further inspection-required advertisement information through keyword comparison between the extracted URL keyword and the target keyword, the further inspection-required advertisement information having low relevance to the advertisement site.

30 Claims, 8 Drawing Sheets

| ADVERTISEMENT INFORMATION | TARGET KEYWORD | RELEVANCE SCORE | INSPECTION INDEX |
|---|---|---|---|
| ADVERTISEMENT KEYWORD A | TARGET KEYWORD a | 80 | 82.5 |
| | TARGET KEYWORD b | 85 | |
| ADVERTISEMENT KEYWORD B | TARGET KEYWORD c | 75 | 75 |
| T&D C | TARGET KEYWORD a | 80 | 85 |
| | TARGET KEYWORD b | 85 | |
| | TARGET KEYWORD d | 90 | |
| T&D D | TARGET KEYWORD b | 85 | 86.7 |
| | TARGET KEYWORD c | 75 | |
| | TARGET KEYWORD e | 100 | |
| T&D E | TARGET KEYWORD x | 20 | 17.5 |
| | TARGET KEYWORD y | 15 | |

METHOD AND SYSTEM OF INSPECTING ADVERTISEMENT THROUGH KEYWORD COMPARISON

CROSS-REFERENCE TO RELATED APPLICATION

This application claims the benefit of Korean Patent Application No. 10-2007-0043654, filed on May 4, 2007, in the Korean Intellectual Property Office, the disclosure of which is incorporated herein by reference.

BACKGROUND OF THE INVENTION

1. Field of the Invention

The present invention relates to a method and system of inspecting contents of an advertisement.

2. Description of Related Art

Among advertisers, a search system using the Internet is in the limelight as an optimal method that provides customers with advertisement information since the search system using the Internet can maximize an advertising impact due to users being simultaneously provided with both the advertisement information and advertisement data related to the advertisement information, by merely entering a keyword.

Among advertisements via the Internet, a keyword advertisement is representative of various advertising methods. When an advertisement or an advertising agent registers a keyword that is expected to most effectively express its website, company, or product, at a search portal site, and a user enters a search word into an input window and then performs a search, a keyword advertisement is an advertisement region for displaying, as a search result, an advertisement of an advertiser that purchases a keyword corresponding to the search word. The advertiser may entrust a keyword advertisement to a search portal site by registering a Universal Resource Locator (URL), an advertisement keyword, and Title and Description (T&D) information for exposure for the advertiser's advertisement in the search portal site.

An Internet search portal site inspects an advertisement when there exist registrations of the Universal Resource Locator (URL), an advertisement keyword, and Title and Description (T&D) information for exposure from advertisers. Through the inspection of the advertisement, keywords that may cause a social issue, keywords for adult-oriented contents, advertisement keywords that are unrelated to an advertisement of an advertiser but may increase frequencies of exposure of an advertisement, and advertisement information for exposure may be excluded.

Currently, an inspector manually performs inspection on advertisements one by one when advertisers register the advertisements. In order to verify whether an advertisement keyword is related to an advertisement site of the advertiser and to verify whether to expose advertisement information, the inspector manually performs inspection by directly accessing to the advertisement site of the advertiser and checking text descriptions. However, such inspections may have problems in that, keywords that are inappropriate for registration are registered since such inspections are performed by a human.

As an example, a keyword such as "component phone" that was a focal point in the past when the keyword was registered, and "component phone" was a verboten keyword since "component phone" caused a social issue. However, the inspector overlooked "component phone" during the inspection, and a problem of the advertisement being exposed for the unacceptable keyword occurred.

BRIEF SUMMARY OF THE INVENTION

The present invention provides a method and system of inspecting an advertisement through keyword comparison which can alert an inspector for further inspection when the advertisement information to be displayed for advertising is less relevant to an advertiser's website to be advertised.

According to the present invention, there is provided a method of inspecting an advertisement using keywords comparison including: receiving advertisement information associated with at least one website from an advertiser for its advertising; crawling the at least one website associated with the URL; extracting at least one URL keyword from the crawled website; extracting at least one target keyword from the advertisement information associated with the URL; and evaluating a relationship between the at least one URL keyword and the at least one target keyword in accordance with a predetermined rule; and determining if further inspection is required for the advertising based, at least in part, upon the relationship between the at least one URL keyword and the at least one target keyword.

The advertisement information includes the Universal Resource Locator (URL), at least one first keyword, and advertising content to be displayed for the advertising According to an aspect of the present invention, the step of determining if further inspection is recommended through keyword comparison between the extracted URL keyword and the target keyword includes: determining an inspection index of each of the plurality of advertisement information through keyword comparison between the extracted URL keyword and the target keyword; and determining if further inspection is recommended by comparing the inspection index.

According to another aspect of the present invention, the determining of the inspection index of each of the plurality of advertisement information through keyword comparison between the extracted URL keyword and the target keyword includes: determining a relevance score of the target keyword with respect to the URL keyword; and determining an inspection index of each of the plurality of advertisement information based on the determined relevance score of the target keyword.

According to still another aspect of the present invention, the determining of the inspection index of each of the plurality of advertisement information based on the determined relevance score of the target keyword includes: matching each of the plurality of advertisement information to a relevance score of at least one target keyword extracted from the each of the plurality of advertisement information; and averaging a relevance score being matched to the each of the plurality of advertisement information and determining the averaged relevance score to be an inspection index for the each of the plurality of advertisement information.

According to yet another aspect of the present invention, the step of determining if further inspection is recommended through keyword comparison between the extracted URL keyword and the target keyword includes: determining the relevance score of the target keyword with respect to the extracted URL keyword; comparing the target keyword based on the relevance score; determining a keyword that requires further inspection; and determining if further inspection is recommended.

According to another embodiment of the present invention, there is provided a method of inspecting an advertisement including: receiving advertisement information associated with at least one website from an advertiser for its advertising; extracting at least one social issue keyword from at least one predetermined web page; extracting at least one target keyword from the advertisement information associated with the URL; and evaluating relationship between the at least one social issue keyword and the at least one target keyword in accordance with a predetermined rule. The at least one social issue keyword includes at least one keyword related to at least one social issue.

According to still another embodiment of the present invention, there is provided a system of inspecting an advertisement including: means for receiving advertisement information associated with at least one website from an advertiser for its advertising; a Universal Resource Locator (URL) keyword extraction component configured to crawl the at least one website associated with the URL and to extract at least one URL keyword from the crawled website, the at least one URL keyword including at least one keyword extracted from the crawled website; a target keyword extraction component configured to extract at least one target keyword from the advertisement information associated with the URL; and a determination component configured to determine if further inspection is required for the advertising based, at least in part, upon relationship between the at least one URL keyword and the at least one target keyword. The determination component evaluates the relationship between the at least one URL keyword and the at least one target keyword in accordance with a predetermined rule.

According to yet another embodiment of the present invention, there is provided a system of inspecting an advertisement including: means for receiving advertisement information associated with at least one website from an advertiser for its advertising; an issue keyword extraction component to configured to extract at least one social issue keyword from at least one predetermined web page; a target keyword extraction component configured to extract at least one target keyword from the advertisement information associated with the URL; and a determination component configured to evaluate relationship between the at least one social issue keyword and the at least one target keyword in accordance with a predetermined rule. The at least one social issue keyword includes at least one keyword related at least one social issue

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF THE INVENTION

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more components can reside within a process and/or thread of execution, and a module or component can be localized on one computer and/or distributed between two or more computers.

As used herein, the terms "desktop," "PC," "local computer," and the like, refer to computers on which systems (and methods) according to the invention operate. In the illustrated embodiments, these are personal computers, such as portable computers and desktop computers; however, in other embodiments, they can be other types of computing devices (e.g., workstations, mainframes, personal digital assistants or PDAs, music or MP3 players, and the like).

Figure 1:
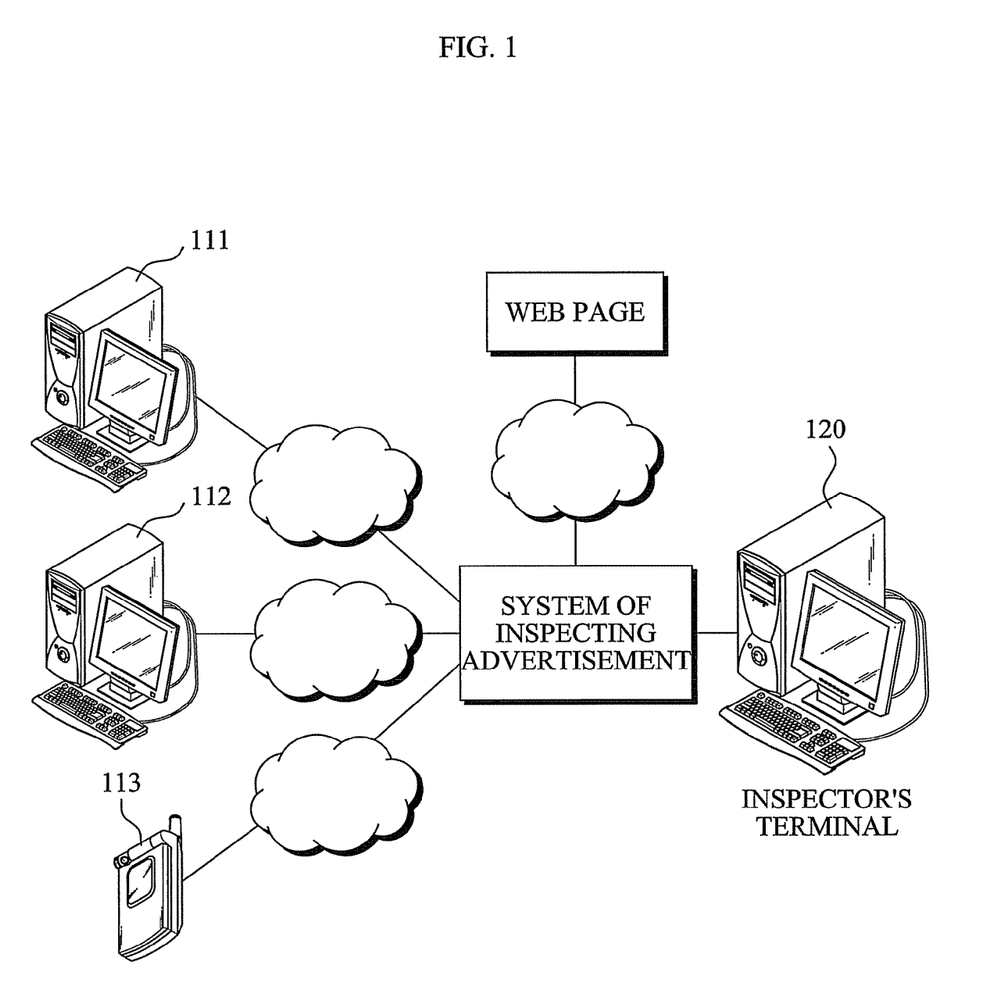
FIG. 1 is a schematic diagram illustrating a method and system of inspecting an advertisement through keyword comparison according to an embodiment of the invention.

FIG. 1 is a schematic diagram illustrating a method and system of inspecting an advertisement through keyword comparison according to an embodiment of the invention.

As illustrated in FIG. 1, the system of inspecting the advertisement registers a Universal Resource Locator (URL), an advertisement keyword, and brief description of the ads, including Title and Description (T&D) information, which are received from a terminal 111 through 113 of an advertiser, determines if further inspection is recommended by comparing keywords, and alerts an inspector for further inspection or displays the keywords requiring further inspection via a terminal 120 of an inspector.

The phrase "further inspection is recommended," "further inspection-required" or "attention-required" used in the present application means that further inspection or evaluation is recommended or necessary for a human or computer inspector. In another embodiment, the system alerts the human or computer inspector so as to attract their attention.

The system of inspecting the advertisement extracts a URL keyword from websites to be advertised. The URL keywords means keywords extracted from the advertiser's websites to be advertised and are collected by crawling the websites linked by the URL registered. The system determines if further inspection is recommended by comparing the extracted URL keyword and the target keyword extracted from advertisement keyword and the advertisement information for exposure. Also, issue keywords, which are related to social issues, are extracted from various web pages via online network, and the further inspection is recommended through comparison between the issue keyword and the target keyword. In one embodiment, the system also provides detailed information for the further inspection.

The URL is a global address of documents and other resources on the World Wide Web. The advertisement keyword is a keyword purchased by an advertiser for a keyword advertisement, and advertisement information of the advertiser who purchased the advertisement keyword is exposed when a user enters the advertisement keyword in an input window. In this instance, one type of exposed advertisements is the advertisement information for exposure, in particular, the advertisement information for exposure appears in forms of titles and abstracts of advertisements before clicking an arbitrary link. Hereinafter, the method and system of inspecting the advertisement through keyword comparison will be described in detail by referring to FIGS. 2 through 8.

In one embodiment, the method of inspecting the advertisement through keyword comparison is divided as below:

1) a URL registered by an advertiser is crawled, and a URL keyword is extracted, a target keyword is extracted from advertisement information being registered by the advertiser, such as an advertisement keyword and advertisement information for exposure, relevance score is determined through keyword comparison between the URL keyword and the target keyword, an inspection index is determined by matching the relevance score to the plurality of advertisement information, and further inspection-required advertisement information is determined by comparing the inspection index;

2) a URL registered by an advertiser is crawled, and a URL keyword is extracted, a target keyword is extracted from advertisement information being registered by the advertiser, such as an advertisement keyword and advertisement information for exposure, a relevance score is determined through keyword comparison between the URL keyword and the target keyword, an attention-required inspection keyword is determined by comparing the relevance score, and the advertisement information in which the attention-required inspection keyword is extracted is determined to be the further inspection-required advertisement information.

Figure 2:
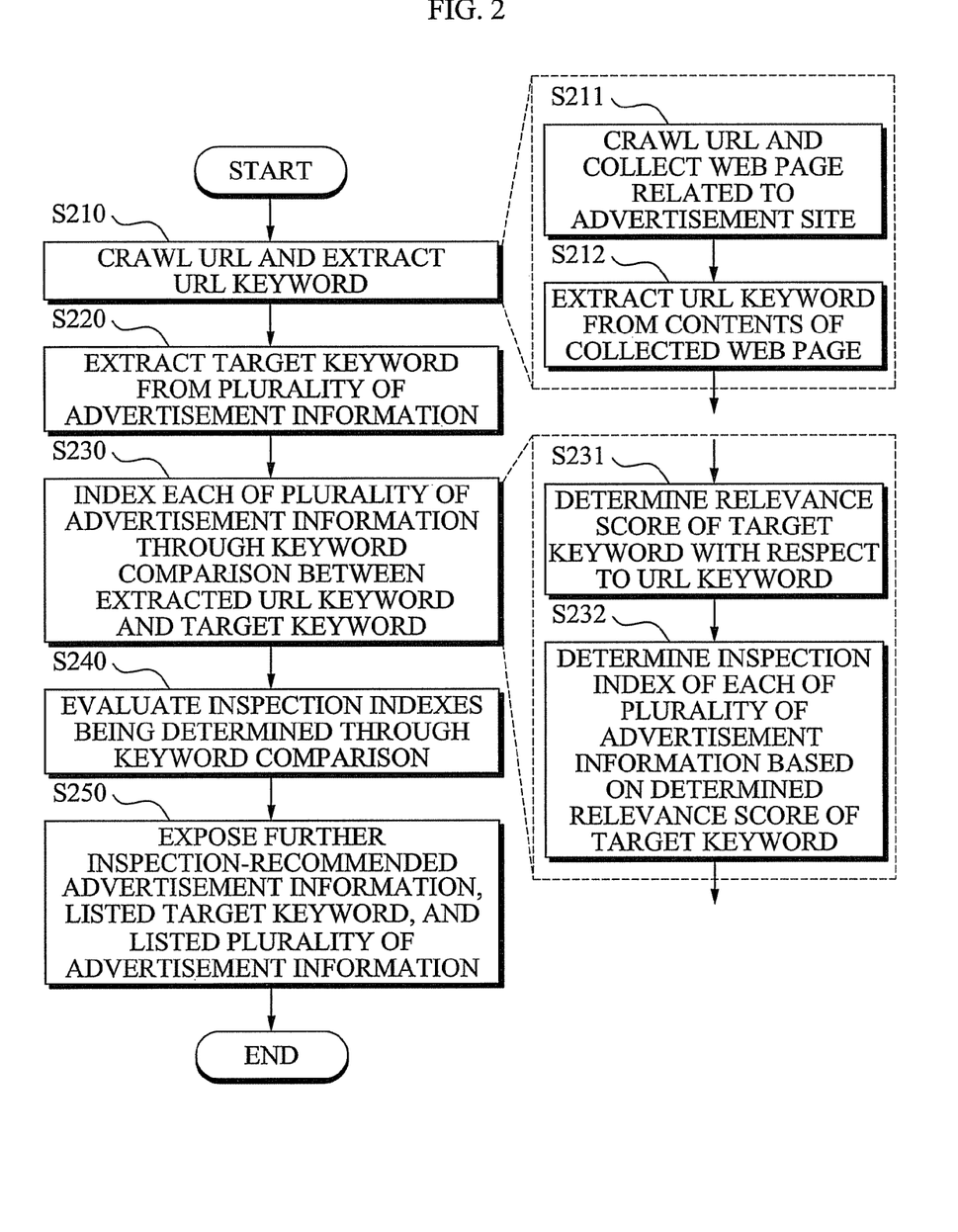
FIG. 2 is a flowchart illustrating a method of inspecting an advertisement through keyword comparison according to an embodiment of the invention.

3) An issue keyword is extracted from news sites and real-time issue keyword providing sites being connected to an Internet network and a target keyword is extracted from advertisement information being registered by an advertiser, such as a URL, ad advertisement keyword, and advertisement information for exposure, a relevance score of the target keyword is determined through keyword comparison between the issue keyword and the target keyword, an attention-required inspection keyword is determined by comparing the relevance score, and advertisement information in which the attention-required inspection keyword is extracted is determined;

FIG. 2 is a flowchart illustrating a method of inspecting an advertisement through keyword comparison according to an embodiment of the invention. As illustrated in FIG. 2, the method of inspecting the advertisement through keyword comparison according to the embodiment of the invention includes operations S210 through S250.

In operation S210, the system of inspecting the advertisement through keyword comparison crawls a URL registered by and advertiser and extracts a URL keyword related to an advertisement site of the advertiser. As illustrated in FIG. 2, operation S210 includes operations S211 and S212.

In one embodiment, the system of inspecting the advertisement through keyword comparison crawls the URL and collects the web page related to the advertisement site of the advertiser in operation S211, and extracts the URL keyword from contents of the collected web page in operation S212. In order to collect web page related to the advertisement site of the advertiser, the method of inspecting the advertisement through keyword comparison further collects a representative web page which is directly connected via the URL and collect web page linked to the representative web page in operation S211.

As described above, the URL is a kind of a system displaying locations of a great number of servers on the Internet in order to obtain required information provided from the great number of servers. Through the URL, an address of the advertisement site of the advertiser is displayed, and a web page address provided by the advertisement site is displayed. In one embodiment, the aforementioned crawling denotes collecting web documents that exist on the Internet, and an application program of a "crawling robot" exist for the crawling. Accordingly, crawling a URL denotes collecting representative web page being distinguished via the URL, further to this, further collecting web page linked to the representative web page. Contents are extracted from the collected web page, and the URL keyword is extracted based on the contents. Since the URL keyword is extracted from the advertisement site of the advertiser, the URL keyword is a most related keyword to the advertisement information of the advertiser. In fact, a search portal site extracts a keyword being extracted from an advertisement site of an advertiser to be an advertisement keyword, recommends the advertisement keyword to the advertiser, thereby providing an effective service with respect to a keyword advertisement.

In operation S220, the system of inspecting the advertisement extracts the target keyword from a plurality of advertisement information being registered in relation to the URL. The advertisement information includes an advertisement keyword and T&D information, which are registered by the advertiser.

The advertisement keyword is a keyword purchased by an advertiser for a keyword advertisement, and advertisement information of the advertiser who purchased the advertisement keyword is exposed when a user enters the advertisement keyword in an input window. In this instance, one type of exposed advertisements is the advertisement information for exposure, in particular, the advertisement information for exposure appears in forms of titles and abstracts of advertisements before clicking an arbitrary link.

A reason for the inspecting the advertisement is to monitor advertisement information that is registered in the purpose of only increasing frequencies of clicks on advertisement or exposures on a search portal site, regardless of the advertisement registered by the advertiser. The advertisement keyword and advertisement information for exposure included in the advertisement information are targets of the inspection. In order to extract the target keyword from the advertisement information, the system of inspecting the advertisement extracts characters from contents of the advertisement information, and determines word information having at least one syllable to be the target keyword.

In operation S230, in one embodiment, in order to determine if further inspection is recommended due to remote relevance between the advertisement information and the websites to be advertised by using keyword comparison between the extracted URL keyword and the target keyword, the system of inspecting the advertisement indexes each of the plurality of advertisement information through keyword comparison between the extracted URL keyword and target keyword. As illustrated in FIG. 2, operation S230 includes operations S231 and S232.

In operation S231, the system of inspecting the advertisement determines degree of relevance of the target keyword with respect to the URL keyword in order to determine an inspection index of each of the plurality of advertisement information through keyword comparison between the extracted URL keyword and the target keyword.

In one embodiment, a relevance determination method is used to determine the relevance score of the target keyword with respect to the URL keyword. The relevance determination method is to determine how much the target keyword is related to at least one URL keyword. The relevance score shows relevance between the target keyword and the URL keyword through the relevance determination method.

In one embodiment, the system of inspecting the advertisement calculates frequency of occurrence of a plurality of query sets by considering a first query and a second query as a query set, and determines the calculated frequency of occurrence of the plurality of query sets to be relevance score of the first and second query. In the case of the aforementioned relevance determination method using the query sets, there is high relevance between the first query being entered by a user and the second query being entered after the first query is entered.

In another embodiment of the determining of the relevance score, the system of inspecting the advertisement is determined through document sets such as news and articles existing on webs.

The system of inspecting the advertisement, by using the relevance determination method based on the document sets, obtains word statistics information through words included in the document sets, documents, word classification with respect to the words, and document classification with respect to the documents, standardizes the word statistics information, and determines the relevance score between the keywords based on the standardized word statistics information. The system of inspecting the advertisement determines the relevance score between the keywords by obtaining frequencies of occurrence of each word and cross-occurrence frequency of documents in which the each word and other words occur together, the frequencies of occurrence of each word indicating frequency of occurrence of each word.

In still another embodiment of the determining of the relevance score, the system of inspecting the advertisement determines the relevance score based on related search word sets being extracted from a related search word database provided by an Internet portal site. The related search word existing in the related search word set is reliable information being calculated by measuring relevance from a search portal site.

The aforementioned relevance determination method is nothing but an embodiment to determine the relevance score, and various methods can be used to determine the relevance score of the target keyword with respect to the URL keyword in the specification of the present invention. Also, the relevance score is determined by simultaneously using at least two relevance score determination methods being selected from among the plurality of the determining of the relevance score.

In operation S232, the system of inspecting the advertisement determines inspection index of each of the plurality of advertisement information based on the determined relevance score of the target keyword.

The system of inspecting the advertisement matches each of the plurality of advertisement information to a relevance score of at least one target keyword extracted from each of the plurality of advertisement information, and average a relevance score being matched to each of the plurality of advertisement information, and determine the averaged relevance score to be an inspection index for each of the plurality of advertisement information. Later, operation S232 will be described in detail by referring to FIG. 4.

In operation S240, in order to determine if further inspection is recommended due to the remote relevance between advertisement information and the websites to be advertised by comparing the extracted URL keyword to the target keyword, the system of inspecting the advertisement evaluates the inspection indexes determined through the keyword comparison between the extracted URL keyword and the target keyword.

Specifically, the system of inspecting the advertisement determines that further inspection is recommended for advertisement information whose inspection index is lowest by comparing an inspection index of each of the plurality of advertisement information, and determines that further inspection is recommended for advertisement information whose inspection index is lower than a predetermined value, for example lower than 50, in one embodiment. In another embodiment, the number of further inspection-required advertisement information is determined to be as many as/the same number as a number of the attention-required inspection by determining the number of the further inspection-required advertisement information. An inspector who is alerted for further inspection of the advertisement information inspects the advertisement information more carefully since the inspector receives relevant information for inspection.

In operation S250, the system of inspecting the advertisement exposes the further inspection-recommended advertisement information, lists the target keyword based on the relevance score and exposes the listed target keyword, and lists the plurality of advertisement information based on the inspection index and exposes the listed plurality of advertisement information.

According to the system of inspecting the advertisement information, it is possible to more flexibly inspect advertisement information than exclusively exposing the determined further inspection-required advertisement information since the target keyword is listed based on the relevance score to be exposed, and the plurality of advertisement information are listed based on the inspection index to be exposed.

Figure 3:
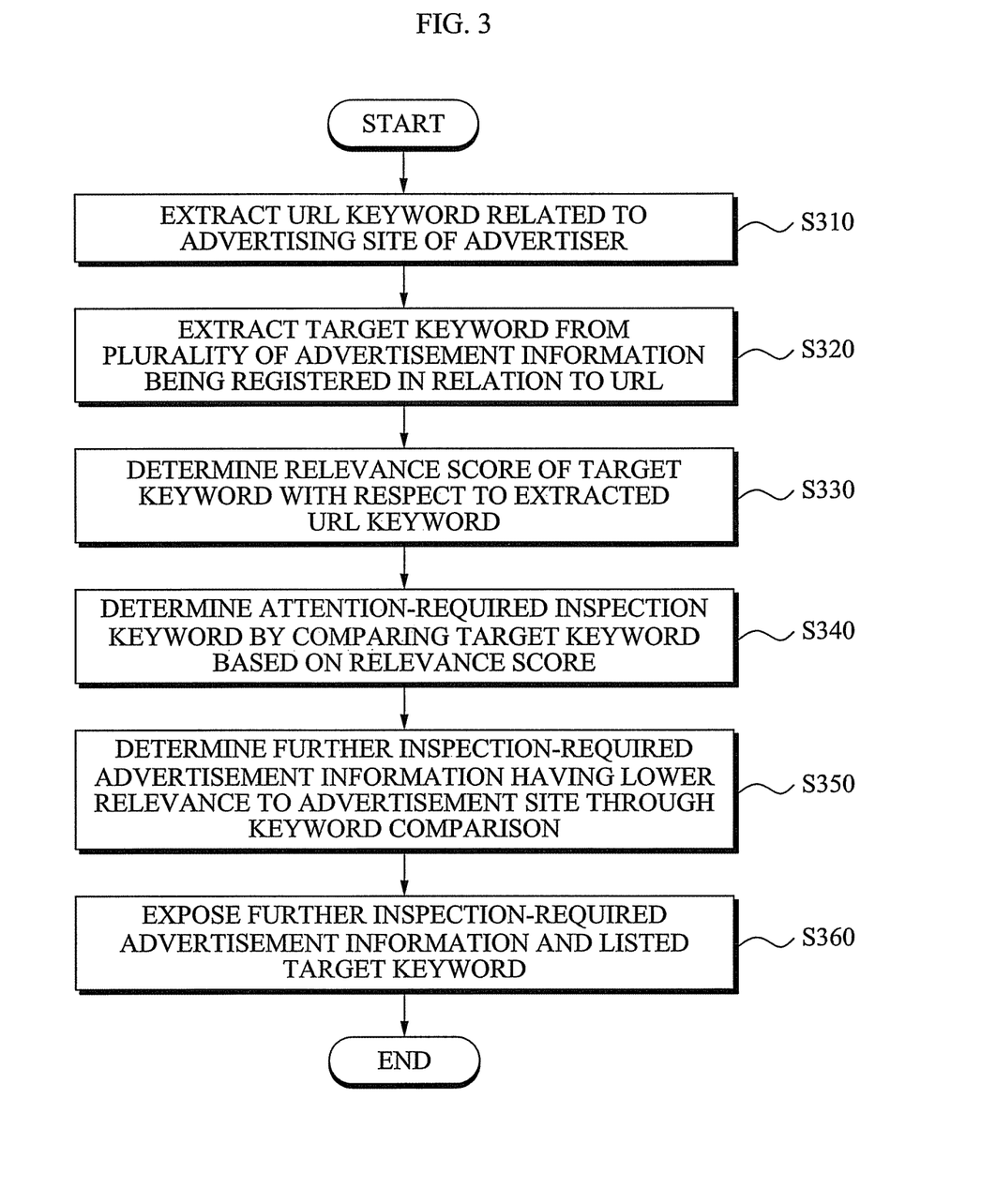
FIG. 3 is a flowchart illustrating a method of inspecting an advertisement through keyword comparison according to another embodiment of the invention.

FIG. 3 is a flowchart illustrating a method of inspecting an advertisement through keyword comparison according to another embodiment of the invention. As illustrated in FIG. 3, the method of inspecting the advertisement information includes operations S310 through S360.

In operation S310, the system of inspecting the advertisement crawls a URL registered by an advertiser and extracts a URL keyword related to an advertisement site of the advertiser. Operation S310 is performed in a same way of operation S210.

In operations S320, the system of inspecting the advertisement extracts a target keyword from a plurality of advertisement information being registered in relation to the URL.

The advertisement information includes an advertisement keyword and T&D information, which are registered by the advertiser. Operation S320 is performed in a same way of operation S220.

In operation S330, in order to determine further inspection-required advertisement information having lower relevance to the advertisement site through keyword comparison between the extracted URL keyword and target keyword, the system of inspecting the advertisement determines a relevance score of the target keyword with respect to the extracted URL keyword.

A relevance determination method is used to determine the relevance score of the target keyword to the URL keyword. The relevance determination method is to determine how much the target keyword is related to at least one URL keyword. The relevance score shows relevance of the target keyword to the URL keyword through the relevance determination method.

In an embodiment of the determining of the relevance score, the system of inspecting the advertisement calculates frequency of occurrence of a plurality of query sets by considering a first query and a second query as a query set, and determines the calculated frequency of occurrence of the plurality of query sets to be relevance scores of the first and second query. In the case of the aforementioned relevance determination using the query sets, there is high relevance between the first query being entered by a user and the second query being entered after the first query is entered.

In another embodiment of the determining of the relevance score, the system of inspecting the advertisement is determined through document sets such as news and articles existing on webs.

The system of inspecting the advertisement, by using the relevance determination method based on the document sets, obtains word statistics information through words included in the document sets, documents, word classification with respect to the words, or document classification with respect to the documents, standardizes the word statistics information, and determines the relevance score between the keywords based on the standardized word statistics information. The system of inspecting the advertisement determines the relevance score between the keywords by obtaining frequency of occurrence of each word and cross-occurrence frequency of documents in which the each word and other words occur together, the frequency of occurrence of each word indicating frequency of occurrence of each word.

In still another embodiment of the determining of the relevance score, the system of inspecting the advertisement determines the relevance score using related search word sets being extracted from a related search word database provided by an Internet portal site. The related search word existing in the related search word set is reliable information being calculated by measuring relevance from a search portal site.

The aforementioned relevance determination method is nothing but one embodiment to determine the relevance score, and various methods can be used to determine the relevance score of the target keyword with respect to the URL keyword in the specification of the present invention. Also, the relevance score is determined by simultaneously using at least two relevance determination methods being selected from among the plurality of the determining of the relevance score.

In operation S340, in order to determine attention-required advertisement information having lower relevance to the advertisement site through keyword comparison between the extracted URL keyword and target keyword, the system of inspecting the advertisement determines an attention-required inspection keyword through keyword comparison between the target keyword with the URL keyword based on the relevance score.

Specifically, the system of inspecting the advertisement determines a target keyword having lowest relevance value to be the attention-required inspection keyword by comparing a relevance score of each of the target keywords, and determines a target keyword whose relevance value is lower than a predetermined value, for example lower than 50, to be the attention-required inspection keyword.

In operation S350, in order to determine further inspection-required advertisement information having lower relevance to the advertisement site of the advertiser through keyword comparison between the extracted URL keyword and target keyword, the system of inspecting the advertisement determines advertisement information in which the attention-required keyword is extracted to be the further inspection-required advertisement information.

The target keyword that can be extracted from each of the plurality of advertisement information is at least one, and the advertisement information that can be extracted the attention-required inspection keyword may be at least one. In particular, the further inspection-required advertisement information exists even when the attention-required inspection keyword is a single term, and the further inspection-required advertisement information is a single term even when the attention-required inspection keyword exists.

The system of inspecting the advertisement does not exclude advertisement information which is determined to be further inspection-required advertisement information without condition, but exposes the farther inspection-required advertisement information to an inspector, therefore the inspector effectively determines on the advertisement information according to the method of inspecting the advertisement.

In operation S360, the system of inspecting the advertisement exposes the determined further inspection-required advertisement information, and lists the target keyword based on the relevance score and exposes the listed target keyword.

By listing the target keyword based on the relevance score and exposing the listed target keyword to the inspector, it is possible to inspect advertisement information more flexibly than being exclusively exposed the determined further inspection-required advertisement information.

Figure 4:
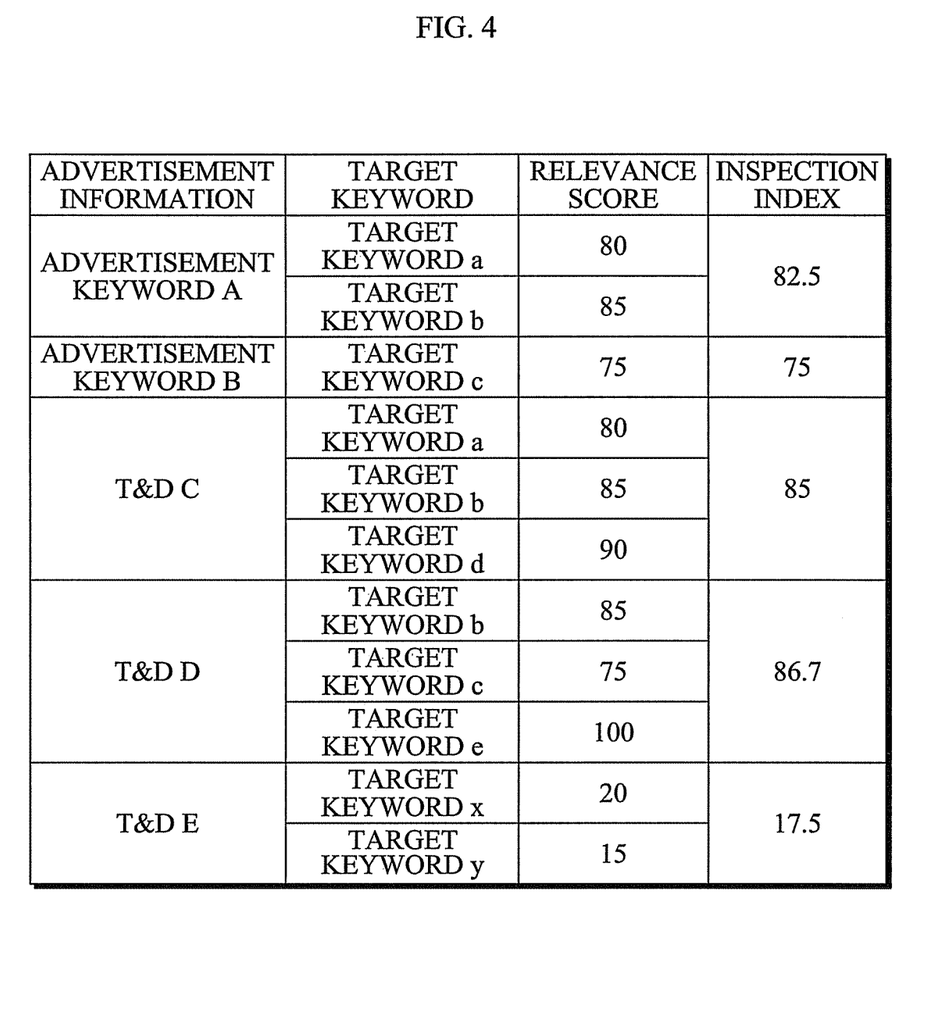
FIG. 4 is a diagram illustrating an example of determining an inspection index of advertisement information through keyword comparison according to an embodiment of the invention.

FIG. 4 is a diagram illustrating an example of determining an inspection index of advertisement information through keyword comparison according to an embodiment of the invention.

As illustrated in FIG. 4, a system of inspecting an advertisement matches each of the plurality of advertisement information to a relevance score of at least one target keyword extracted from each of the plurality of advertisement information, and average a relevance score being matched to each of the plurality of advertisement information to determine the averaged relevance score to be an inspection index for each of the plurality of advertisement information.

Specifically, the target keyword being extracted from each of the plurality of advertisement information which include the advertisement keyword and advertisement information for exposure is at least one. As above described, after a relevance score of each target keyword is determined, the relevance score of the each target keyword is matched to advertisement information in which the each target keyword is extracted. As an example, T&D C illustrated in FIG. 4, which is one of the plurality of advertisement information, has a target keyword 'a', a target keyword 'b', and a target keyword 'd' being extracted from T&D C as the target keyword. As illustrated in FIG. 4, the target keywords 'a' and 'b' are extracted from other advertisement information except T&D C. That is, each target keyword is extracted from at least one advertisement information, and the relevance score of the each target keyword is matched to the at least one advertisement information. By averaging the relevance score being matched to the each advertisement information, the inspection index of the plurality of advertisement information is determined. As an example, an inspection index of T&D C can be 85 that is an average of 80, 85, and 90, which are relevance scores being matched to T&D C.

Figure 5:
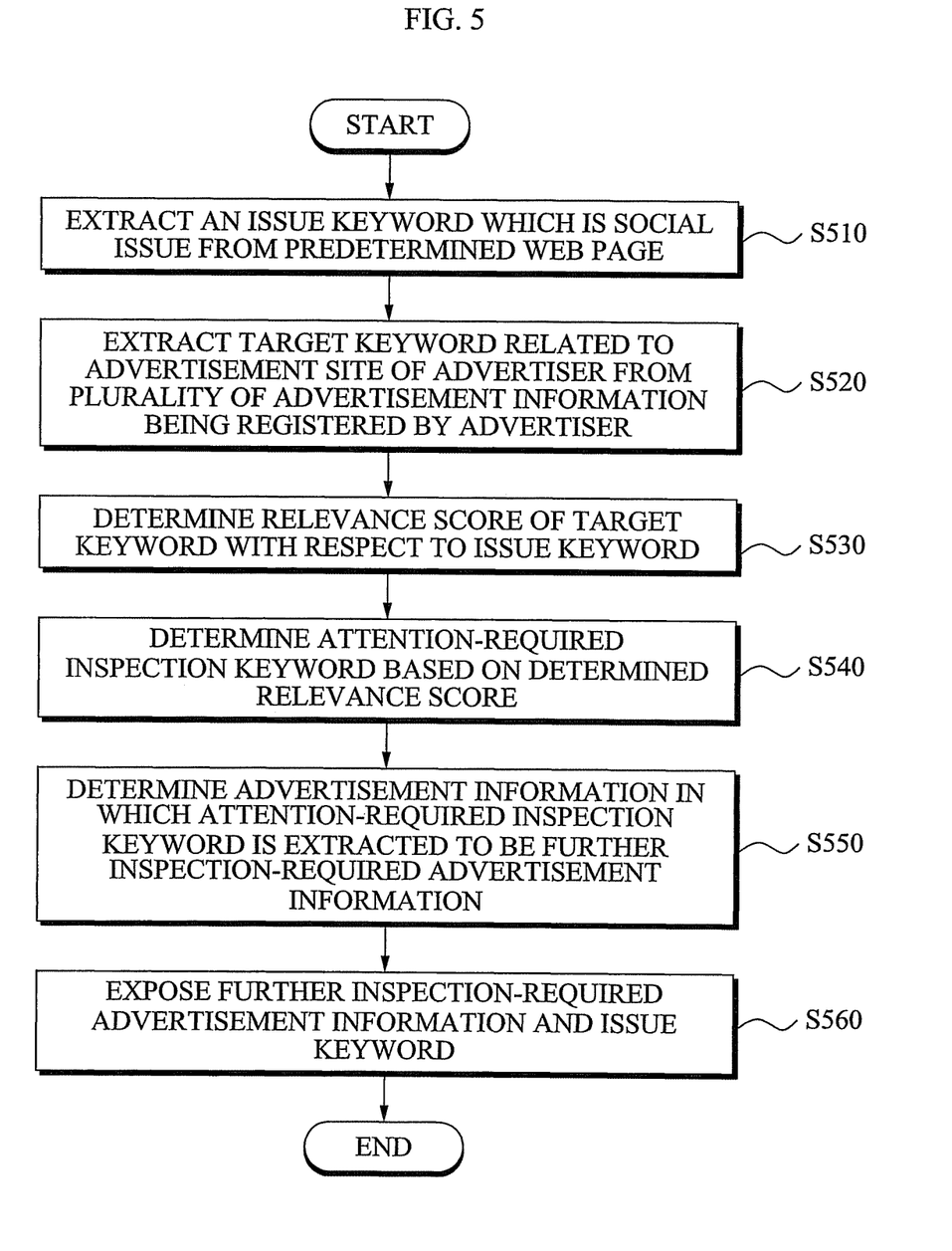
FIG. 5 is a flowchart illustrating a method of inspecting an advertisement through keyword comparison according to still another embodiment of the invention.

FIG. 5 is a flowchart illustrating a method of inspecting an advertisement through keyword comparison according to an embodiment of the invention. As illustrated in FIG. 5, the method of inspecting the advertisement includes operations S510 through S560.

In operation S510, a system of inspecting an advertisement extracts an issue keyword which is a social issue from a predetermined web page, and the predetermined web page includes a news page of an Internet news site and a real-time issue keyword page on a search portal site.

The issue keyword which is the social issue includes advertisement information being registered by an advertiser and having no relevance to advertisement of the advertiser in order to increase an advertising impact or to increase frequencies of exposure of advertisement, such, as an adult keyword and a currently focused keyword by media. The system of inspecting the advertisement extracts the issue keyword from a news page of an Internet news site and a real-time issue keyword page of a search portal site, and extracts the issue keyword from web documents which reflect social issues, as well as the news page and issue word page. Namely, the aforementioned Internet pages are nothing but one example, the system of inspecting the advertisement extracts the issue keyword using various embodiments of the present invention.

In operation S520, the system of inspecting the advertisement extracts a target keyword related to the advertisement site of the advertiser from a plurality of advertisement information being registered by the advertiser, and the plurality of advertisement information includes a URL, an advertisement keyword, and T&D information, which are registered by the advertiser.

The advertisement keyword is a keyword purchased by an advertiser for a keyword advertisement, and advertisement information of the advertiser who purchased the advertisement keyword is exposed when a user enters the advertisement keyword in an input window. In this instance, one type of exposed advertisements is the advertisement information for exposure, in particular, the advertisement information for exposure appears in forms of titles and abstracts of advertisements before clicking an arbitrary link.

A reason for the inspecting the advertisement is to monitor advertisement information that is registered in the purpose of only increasing frequencies of clicks on advertisement or exposures on a search portal site, regardless of the advertisement registered by the advertiser, and the URL, advertisement keyword, and T&D information are targets for the inspection.

Accordingly, the advertisement information is required to be extracted before the further inspection-required advertisement information is determined. In order to extract the target keyword from the advertisement information, the system of inspecting the advertisement extracts characters from contents of the advertisement information, and determines word information having at least one syllable to be the target keyword. In operation S520, the URL indicates character strings displaying the URL, not advertisement sites and pages to which can be connected via the URL.

In operation S530, the system of inspecting the advertisement determines a relevance score of the target keyword with respect to the issue keyword in order to determine further inspection-required advertisement information which is required to be monitored due to becoming a social issue through keyword comparison between the extracted issue keyword and the target keyword.

A relevance determination method is used to determine a relevance score of the target keyword with respect to the issue keyword. The relevance determination method is to determine how much the target keyword is related to at least one issue keyword. The relevance score shows relevance of the target keyword with respect to the issue keyword through the relevance determination method.

In an embodiment of the determining of the relevance score, the system of inspecting the advertisement calculates frequency of occurrence of a plurality of query sets by considering a first query and a second query as a query set, and determines the calculated frequency of occurrence of the plurality of query sets to be relevance scores of the first and second query. In the case of the aforementioned relevance determination method using the query sets, there is high relevance between the first query being entered by a user and the second query being entered after the first query is entered.

In another embodiment of the determining of the relevance score, the system of inspecting the advertisement is determined through document sets such as news and articles existing on webs.

The system of inspecting the advertisement by using the relevance determination method based on the document sets, obtains word statistics information through words included in the document sets, documents, word classification with respect to the words, and document classification with respect to the documents, standardizes the word statistics information, and determines the relevance score between the keywords based on the standardized word statistics information. The system of inspecting the advertisement determines the relevance score between the keywords by obtaining frequencies of occurrence of each word and cross-occurrence frequency of documents in which the each word and other words occur together, the frequencies of occurrence of each word indicating frequency of occurrence of each word.

In still another embodiment of the determining of the relevance score, the system of inspecting the advertisement determines the relevance score based on related search word sets being extracted from a related search word database provided by an Internet portal site. The related search word existing in the related search word set is reliable information being calculated by measuring relevance from a search portal site.

The aforementioned relevance determination method is nothing but one embodiment to determine the relevance score, and various methods are used to determine the relevance score of the target keyword with respect to the issue keyword in the specification of the present invention. Also, the relevance score is determined by simultaneously using at least two relevance score determination methods being selected from among the plurality of the determining of the relevance score.

Unlike operation S330, the system of inspecting the advertisement indicates a relevance score being determined through a 1:1 comparison with respect to each of a plurality of issue keywords. Specifically, if one of the each of the plurality of issue keywords is "Hyori Lee", a relevance score of a target keyword is determined with respect to "Hyori Lee." That is, the plurality of issue keywords are matched to the plurality of target keywords n:n, the relevance score is determined for all possible cases that can be matched n:n.

In operation S540, in order to determine the further inspection-required advertisement information advertisement information which is required to be monitored due to becoming a social issue from among the plurality of advertisement information, the system of inspecting the advertisement determines attention-required inspection keyword based on the determined relevance score.

Specifically, the system of inspecting the advertisement determines a target keyword whose relevance score is highest by comparing a relevance score of each of the target keywords to be an attention-required inspection keyword, and determines a target keyword whose relevance score is lower than a predetermined value, for example lower than 50, to be the attention-required inspection keyword. The number of extracted attention-required inspection keyword is not as many as a number of the extracted plurality of issue keywords, and a target keyword whose relevance score is greater than a predetermined value is determined as the attention-required inspection keyword.

In operation S550, in order to determine further inspection-required advertisement information which is required to be monitored due to becoming a social issue through keyword comparison between the extracted target keyword and issue key word from among the plurality of advertisement information, the system of inspecting the advertisement determines advertisement information in which the attention-required inspection keyword is extracted to be the further inspection-required advertisement information.

The target keyword that can be extracted from each of the plurality of the advertisement information may be at least one, and the advertisement information that can be extracted the attention-required inspection keyword may be at least one. In particular, the further inspection-required advertisement information exists even when the attention-required inspection keyword is a single term, and the further inspection-required advertisement information is a single term even when the attention-required inspection keyword exists.

The system of inspecting the advertisement does not exclude advertisement information which is determined to be further inspection-required advertisement information without condition, but exposes the further inspection-required advertisement information to an inspector, therefore the inspector effectively determines the advertisement information according to the method of inspecting the advertisement.

In operation S560, the system of inspecting the advertisement exposes the determined further inspection-required advertisement information, and exposes an issue keyword by matching the attention-required inspection keyword to an issue keyword related to the attention-required inspection keyword.

By matching the attention-required inspection keyword to an issue keyword related to the attention-required inspection keyword, it is possible to inspect advertisement information more flexibly than being exclusively exposed the determined further inspection-required advertisement information.

Figure 6:
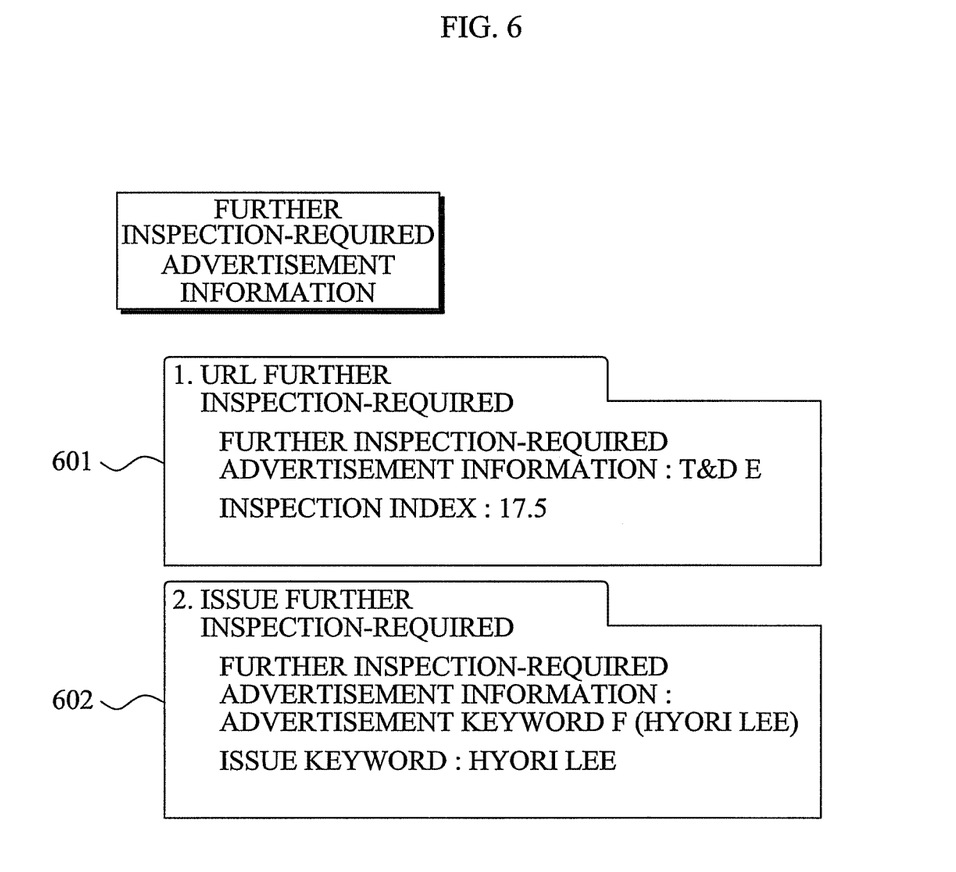
FIG. 6 is a diagram illustrating a window in which further inspection-required advertisement information is exposed according to an embodiment of the invention.

FIG. 6 is a diagram illustrating a window in which further inspection-required advertisement information is exposed according to an embodiment of the invention.

As illustrated in FIG. 6, according to an embodiment of the present invention, a system of inspecting an advertisement determines further inspection-required advertisement information through keyword comparison between a URL keyword and a target keyword, and exposes the determined further inspection-required advertisement information and an inspection index 601 of the determined further inspection-required advertisement information to an inspector.

As illustrated in FIG. 6, according to an embodiment of the present invention, the system of inspecting the advertisement determines further inspection-required advertisement information through keyword comparison between an issue keyword and the target keyword, and expose the determined further inspection-required advertisement information and an issue keyword 602, which is related the determined further inspection-required advertisement information to the inspector.

Figure 7:
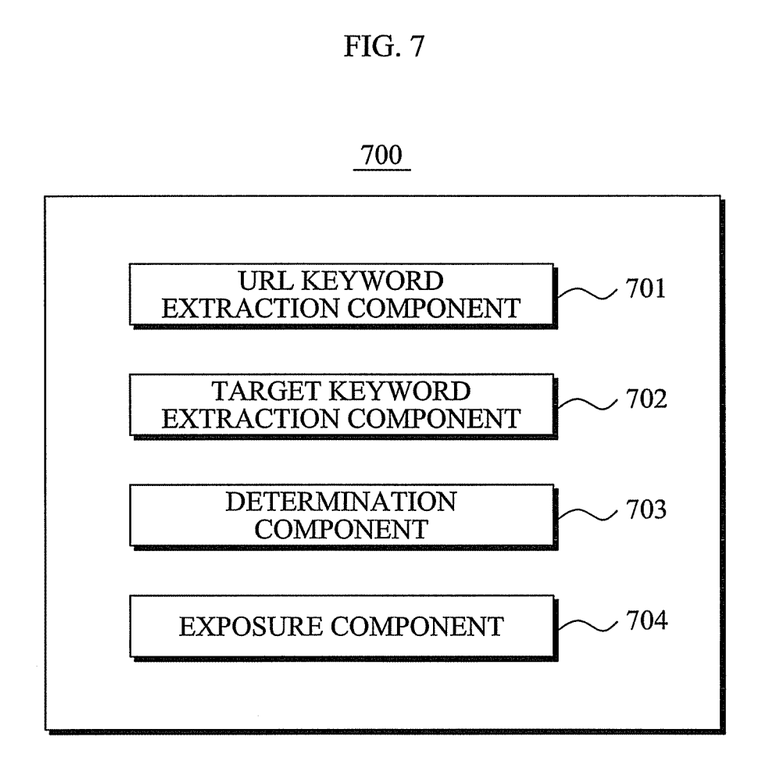
FIG. 7 is a block diagram illustrating a system of inspecting an advertisement through keyword comparison according to an embodiment of the invention.

FIG. 7 is a block diagram illustrating a system 700 of inspecting an advertisement through keyword comparison according to an embodiment of the invention. The system 700 of inspecting the advertisement includes a URL keyword extraction component 701, a target keyword extraction component 702, a determination component 703, and an exposing component 704.

The URL keyword extraction component 701 includes a crawling component that crawls a URL registered by an advertiser and collects a web page related to the advertisement site, and an extraction component that extracts a URL keyword related to an advertisement site of the advertiser. The target keyword extraction component 702 extracts a target keyword from a plurality of advertisement information being registered in relation to the URL. The determination component 703 determines further inspection-required advertisement information having low relevance to the advertisement site of the advertiser through keyword comparison between the extracted URL keyword and the target keyword. The crawling component includes a representative collecting component that collects a representative web page which is directly connected via the URL, and a link collecting component that further collects a web page which is linked to the representative web page. The advertisement information includes an advertisement keyword and T&D information, which are registered by the advertiser.

According to an embodiment of the present invention, the determination component 703 includes an inspection index determination component that determines an inspection index of each of the plurality of advertisement information through keyword comparison between the extracted URL keyword and the target keyword, and an attention-required inspection determination component that determines further inspection-required advertisement information by comparing the inspection index.

The inspection index determination component includes a relevance score determination component that determines a relevance score of the target keyword with respect to the URL keyword, and an index determination component that determines an inspection index of each of the plurality of advertisement information based on the determined relevance score of the target keyword.

The index determination component includes a matching component that matches each of the plurality of advertisement information to a relevance score of at least one target keyword extracted from each of the plurality of advertisement information, and an averaging component that averages a relevance score being matched to each of the plurality of advertisement information and determines the averaged relevance score to be an inspection index for each of the plurality of advertisement information.

According to an embodiment of the present invention, the determination component 703 includes a relevance score determination component that determines a relevance score of the target keyword with respect to the extracted URL keyword, a comparison determination component that compares the target keyword based on the relevance score and determines the attention-required inspection keyword, and an attention-required inspection determination component that determines advertisement information in which the attention-required inspection keyword is extracted to be the further inspection-required advertisement information.

The system 700 of inspecting the advertisement includes a target keyword exposing component that lists the target keyword based on the relevance score and exposes the listed target keyword, an inspection keyword exposing component that exposes the determined attention-required inspection keyword, and an advertisement information exposing component that lists the plurality of advertisement information based on the inspection index and exposes the listed plurality of advertisement information.

Figure 8:
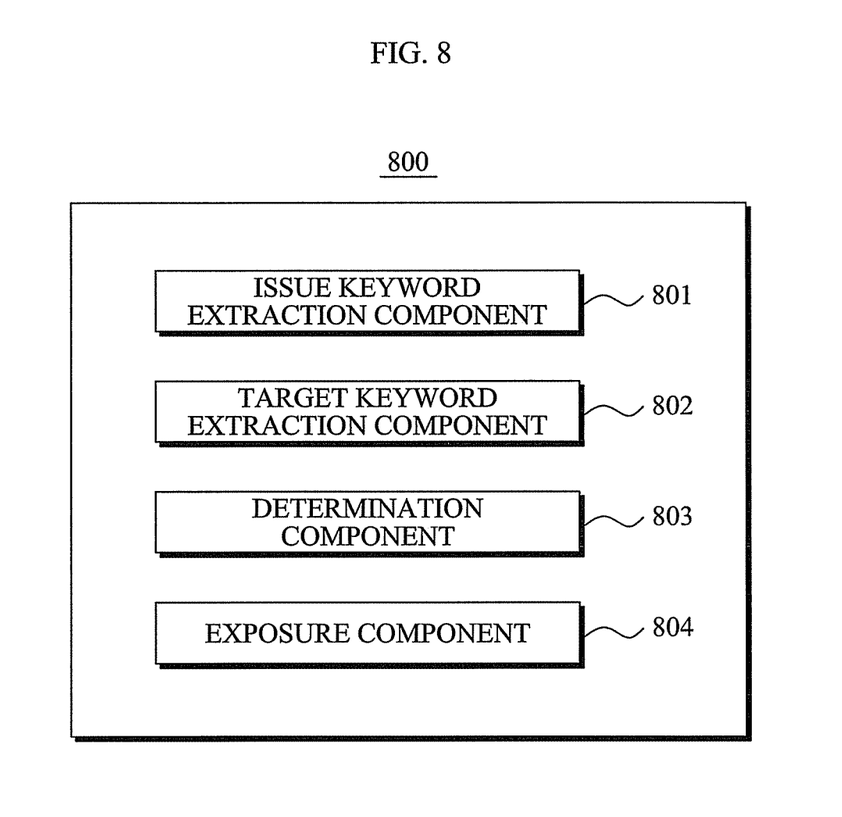
FIG. 8 is a block diagram illustrating a system of inspecting an advertisement through keyword comparison according to another embodiment of the invention.

FIG. 8 is a block diagram illustrating a system 800 of inspecting an advertisement through keyword comparison according to another embodiment of the invention. As illustrated in FIG. 8, the system 800 of inspecting the advertisement includes an issue keyword extraction component 801, a target keyword extraction component 802, a determination component 803, and an exposing component 804. The issue keyword extraction component 801 extracts an issue keyword which is a social issue from a predetermined web page. The target keyword extraction component 802 extracts a target keyword related to an advertisement site of an advertiser from a plurality of advertisement information being registered by the advertiser. The determination component 803 determines further inspection-required advertisement information which is required to be monitored due to becoming a social issue through keyword comparison between the extracted target keyword and issued keyword. The exposing component 804 exposes the determined further inspection-required advertisement information.

The predetermined web page includes a news page of a new site on the Internet and a real-time issue keyword page of a search portal site, and the plurality of advertisement information includes a URL, an advertising keyword, and T&D registered by the advertiser.

The determination component 803 includes a keyword determination component that searches for a target keyword related to the extracted issue keyword and determines a retrieved target keyword to be the attention-required inspection keyword, and an attention-required inspection determination component that determines the advertisement information in which the attention-required inspection keyword is retrieved to be the further inspection-required advertisement information.

The keyword determination component includes an attention-required inspection keyword determination component that calculates a relevance score of the target keyword with respect to the issue keyword and determines the attention-required inspection keyword based on the calculated relevance score.

The system of inspecting the advertisement further includes a keyword exposing component that matches the attention-required inspection keyword to the issue keyword related to the attention-required inspection keyword and exposes the matched result.

The method of inspecting the advertisement according to the above-described exemplary embodiments of the present invention is recorded in computer-readable media including program instructions to implement various operations embodied by a computer. The media also includes, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the present invention, it is possible to provide a user with accurate advertisement information and maximize an advertising impact since a URL keyword related to an advertisement site of an advertiser is extracted by crawling a URL being registered by the advertiser, a target keyword is extracted from a plurality of advertisement information being registered in relation to the URL, further inspection-required advertisement information having low relevance to the advertisement site of the advertiser is determined by comparing the extracted URL keyword and target keyword, advertisement information having lower relevance to the advertisement site of the advertiser is excluded, and a keyword becoming a social issue may not be overlooked during inspection.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

What is claimed is:

1. A computer-implemented method, the method comprising:
   receiving advertisement information associated with a website of an advertiser for advertising, the advertisement information comprising a Universal Resource Locator (URL), one or more advertising keywords, and advertising content to be displayed for the advertising;
   collecting one or more web pages by crawling the URL, wherein a URL keyword is extracted from contents of the collected web pages;
   extracting a target keyword from the advertisement information associated with the website, wherein the target keyword comprises the advertising keywords that are registered by the advertiser;
   determining, by a processor of the computer, a relevance score by using keyword comparison of the target keyword with respect to the URL keyword, the relevance score being determined based on at least one of frequency of occurrence of a plurality of query sets by considering a first query and a second query as a query set, the second query being entered after the first query is entered, word statistics information obtained through words included in document sets existing on webs, documents, word classification with respect to the words or document classification with respect to the documents, and related search word sets being extracted from a related search word database provided by an Internet portal site; and
   determining, by the processor of the computer, an inspection index of each of the advertisement information, the inspection index being an indication of whether an inspection is required for the advertisement information according to the relevance score between the URL keyword and the target keyword.

2. The method of claim 1, wherein crawling the URL comprises:
   crawling at least one website associated with the URL; and
   extracting the URL keyword from contents of a web page linked by the URL.

3. The method of claim 1, wherein the advertising content comprises a title and a description of a website associated with the URL, the advertising content being displayed for the advertising.

4. The method of claim 1, wherein the one or more advertising keywords and the advertising content to be displayed are selected by the advertiser.

5. The method of claim 1, wherein determining the relevance score between the URL keyword and the target keyword comprises:
   indexing a relevance between the URL keyword and the target keyword associated with the advertising; and
   evaluating the value of the relevance based upon the index.

6. The method of claim 5, wherein indexing the relevance comprises:
   indexing the relevance associated with the advertising based upon the relevance score of the target keyword.

7. The method of claim 6, wherein indexing the relevance further comprises:
   matching each of the advertisement information to the relevance score of the target keyword extracted from the advertisement information;
   calculating an average value of the relevance score and matching the average value to each of the plurality of advertisement information; and
   determining the average value of the relevance score to be the value of a relationship between the at least one URL keyword and the at least one target keyword.

8. The method of claim 6, further comprising:
   listing at least one target keyword based on the relevance score; and
   displaying the listed target keyword.

9. The method of claim 5, further comprising:
   listing the target keyword extracted from the advertisement information based on the indexed relevance; and
   displaying the listed advertisement information.

10. The method of claim 1, further comprising:
    checking the target keyword based on the relevance score and whether an attention-required keyword associated with an inspection exists; and
    determining whether the attention-required keyword is extracted and whether the inspection-required advertisement information is further inspected.

11. A method using a processor for inspecting an advertisement, the method comprising:
    receiving advertisement information associated with at least one website of an advertiser for advertising, the advertisement information comprising a Universal Resource Locator (URL), at least one advertising keyword, and advertising contents to be displayed for the advertising;
    extracting at least one keyword associated with a buzzword related to a social issue from at least one web page;
    extracting one or more web pages by crawling the URL, wherein a URL keyword is extracted from contents of the collected web pages;

extracting at least one target keyword extracted from the advertisement information associated with the at least one web site, wherein the target keyword is registered by the advertiser;

determining, by the processor, a relevance relationship between the keyword associated with the buzzword and the target keyword in accordance with a rule, wherein the relevance relationship is determined based on at least one of frequency of occurrence of a plurality of query sets by considering a first query and a second query as a query set, the second query being entered after the first query is entered, word statistics information obtained through words included in document sets existing on webs, documents, word classification with respect to the words or document classification with respect to the documents, and related search word sets being extracted from a related search word database provided by an Internet portal site; and determining, by the processor, an index of each of the advertisement information, the index being an indication of whether an inspection is required for the advertisement information according to the relevance relationship between the URL keyword and the keyword associated with the buzzword.

12. The method of claim 11, wherein at least one web page comprises at least one online news article page and a real-time issue keyword page.

13. The method of claim 11, wherein the advertising contents comprise a title and a description of at least one of the website associated with the URL, the advertising contents being displayed for the advertising.

14. The method of claim 11, further comprising:
displaying the target keyword to determine whether an inspection is required.

15. The method of claim 11, wherein determining the relevance relationship comprises:
searching for a target keyword related to the extracted keyword associated with the buzzword.

16. One or more non-transitory computer-readable storage media comprising a computer-executable program, which when executed by one or more processors, performs:
receiving advertisement information associated with a website of an advertiser for advertising, the advertisement information comprising a Universal Resource Locator (URL), at least one first keyword, and advertising content to be displayed for the advertising;
collecting information by crawling the website associated with the URL, wherein one or more URL keywords are extracted from the website;
extracting one or more target keywords extracted from the advertisement information associated with the website, wherein the target keyword comprises the at least one first keyword registered by the advertiser;
determining, by the one or more processors, a value of a relevance between the URL keywords and the target keywords, wherein the value of the relevance is determined based on at least one of frequency of occurrence of a plurality of query sets by considering a first query and a second query as a query set, the second query being entered after the first query is entered, word statistics information obtained through words included in document sets existing on webs, documents, word classification with respect to the words or document classification with respect to the documents, and related search word sets being extracted from a related search word database provided by an Internet portal site; and determining, by the processor, an index of each of the advertisement information, the index being an indication of whether an inspection is required for the advertisement information, according to the relevance value of between the URL keyword and the target keyword.

17. A system using a server comprising a processor for inspecting an advertisement, the system comprising:
a Universal Resource Locator (URL) keyword extraction component, of the processor, configured to crawl one or more websites associated with URLs to collect information of one or more URL keywords which are extracted from the crawled websites;
a target keyword extraction component, of the processor, configured to extract one or more target keywords comprising one or more advertising keywords extracted from advertisement information, the target keywords being registered by the advertiser, wherein the advertisement information comprises the URLs, one or more keywords for advertising and contents for advertising; and
a determination component, of the processor, configured to determine a relevance score between the URL keywords and the target keywords, the relevance score is determined by the processor based on at least one of frequency of occurrence of a plurality of query sets by considering a first query and a second query as a query set, the second query being entered after the first query is entered, word statistics information obtained through words included in document sets existing on webs, documents, word classification with respect to the words or document classification with respect to the documents, and related search word sets being extracted from a related search word database provided by an Internet portal site, and to determine an inspection index of the advertisement information, the inspection index being an indication of whether an inspection is required for the advertisement information according to the relevance score between the URL keywords and the target keywords.

18. The system of claim 17, wherein the URL keyword extraction component comprises:
a crawling component configured to crawl the one or more websites associated with the URLs, and
an extraction component configured to extract at least one URL keyword from contents of a web page linked by one of the URLs.

19. The system of claim 18, wherein the crawling component further comprises:
a representative web page collecting component configured to collect a representative web page which is directly linked by the URLs, and
a link collecting component configured to collect a web page which is linked to the representative web page.

20. The system of claim 17, wherein the contents for advertising comprise a title and a brief description of the one or more of the websites associated with the URL, the contents being displayed for the advertising.

21. The system of claim 17, wherein the determination component comprises:
an inspection index determination component configured to determine an inspection index of the advertisement information through keyword comparison between the extracted URL keyword and the target keyword; and
an attention-required inspection determination component configured to determine whether an inspection is required for the advertising by comparing the inspection index.

22. The system of claim 21, wherein the inspection index determination component further comprises:
- a relevance score determination component configured to determine the relevance score of the target keyword with respect to the URL keyword, and
- an index determination component configured to determine an inspection index of the plurality of advertisement information based on the determination.

23. The system of claim 22, wherein the index determination component further comprises:
- a matching component configured to match the advertisement information to the relevance score of the target keyword extracted from the advertisement information; and
- an average component configured to average the relevance score being matched to the advertisement information, and to determine whether the averaged relevance score to be an inspection index for the advertisement information.

24. The system of claim 21, wherein the inspection index is determined by comparing the relevance score with the advertisement information.

25. A system comprising a computer comprising a processor for inspecting an advertisement, the system comprising:
- an issue keyword extraction component, of the processor, configured to extract at least one keyword associated with a buzzword related to social issues from at least one web page in response to receipt of advertisement information associated with advertising website of a user, the advertisement information comprising a Universal Resource Locator (URL), at least one keyword and advertising contents;
- a URL keyword extraction component, of the processor, configured to collect one or more web pages by crawling the URL, wherein a URL keyword is extracted from contents of the collected web pages;
- a target keyword extraction component, of the processor, configured to extract at least one target keyword from the advertisement information associated with the advertising website;
- a determination component, of the processor, configured to determine a relevance score by using keyword comparison of the target keyword with respect to the URL keyword, the relevance score being determined based on at least one of frequency of occurrence of a plurality of query sets by considering a first query and a second query as a query set, the second query being entered after the first query is entered, word statistics information obtained through words included in document sets existing on webs, documents, word classification with respect to the words or document classification with respect to the documents, and related search word sets being extracted from a related search word database provided by an Internet portal site, wherein the determination component is further configured to determine an inspection index of the advertisement information, the inspection index being an indication of whether an inspection is required for the advertisement information according to the relationship between the buzzword and the target keyword.

26. The system of claim 25, wherein at least one web page comprises at least one online news article page and a real-time issue keyword page.

27. The system of claim 25, wherein the advertising contents comprises a title and a brief description of at least one website associated with the URL, the advertising contents being displayed for the advertising.

28. The system of claim 25, wherein the determination component further comprises:
- a keyword determination component configured to search for a target keyword related to the keyword associated with the buzzword related to the social issues, and to determine the target keyword to be an attention-required inspection keyword; and
- an attention-required inspection determination component configured to determine the advertisement information whether the attention-required inspection keyword is detected for further inspection.

29. The system of claim 28, wherein the keyword determination component further comprises:
- an attention-required keyword determination component configured to determine a relevance score of the target keyword with respect to the keyword associated with the buzzword related to the social issues, and to determine the attention-required inspection keyword based on the relevance score.

30. The system of claim 28, further comprising:
- a keyword exposing component configured to match the attention-required inspection keyword to the target keyword related to the attention-required inspection keyword, and to expose the matched result.

* * * * *